United States Patent
Seidel et al.

(10) Patent No.: US 11,938,528 B2
(45) Date of Patent: Mar. 26, 2024

(54) METHOD FOR ASCERTAINING CONTROL VARIABLES FOR ACTIVE PROFILE AND FLATNESS CONTROL ELEMENTS FOR A ROLLING STAND AND PROFILE AND AVERAGE FLATNESS VALUES FOR HOT-ROLLED METAL STRIP

(71) Applicant: SMS group GmbH, Düsseldorf (DE)

(72) Inventors: Jürgen Seidel, Kreuztal (DE); Uwe Baumgärtel, Hilchenbach (DE); Ralf Wachsmann, Siegen (DE); Peter Bonekemper, Siegen (DE)

(73) Assignee: SMS group GmbH, Düsseldorf (DE)

( * ) Notice: Subject to any disclaimer, the term of this patent is extended or adjusted under 35 U.S.C. 154(b) by 637 days.

(21) Appl. No.: 17/261,118

(22) PCT Filed: Jul. 18, 2019

(86) PCT No.: PCT/EP2019/069449
§ 371 (c)(1),
(2) Date: Mar. 1, 2021

(87) PCT Pub. No.: WO2020/016387
PCT Pub. Date: Jan. 23, 2020

(65) Prior Publication Data
US 2021/0308731 A1    Oct. 7, 2021

(30) Foreign Application Priority Data
Jul. 19, 2018   (DE) .................... 10 2018 212 074.9

(51) Int. Cl.
*B21B 37/42*    (2006.01)
*B21B 1/26*     (2006.01)
(Continued)

(52) U.S. Cl.
CPC .............. *B21B 37/42* (2013.01); *B21B 1/26* (2013.01); *B21B 13/142* (2013.01); *G05B 13/04* (2013.01);
(Continued)

(58) Field of Classification Search
CPC ......... B21B 37/42; B21B 1/26; B21B 13/142; B21B 2261/04; B21B 2267/18;
(Continued)

(56) References Cited

U.S. PATENT DOCUMENTS

| | | | |
|---|---|---|---|
| 4,711,109 A | 12/1987 | Rohde et al. | |
| 5,502,992 A | 4/1996 | Sorgel et al. | |
| 5,651,281 A | 7/1997 | Seidel | |
| 5,970,765 A | 10/1999 | Seidel | |

(Continued)

FOREIGN PATENT DOCUMENTS

| | | |
|---|---|---|
| CN | 1098032 A | 2/1995 |
| CN | 101618402 A | 1/2010 |

(Continued)

*Primary Examiner* — Ziaul Karim
(74) *Attorney, Agent, or Firm* — Smartpat PLC

(57) ABSTRACT

A method ascertains control variables for active profile and flatness control elements for at least one rolling stand for hot rolling metal strip with a plurality of i=1 . . . I successive passes and for ascertaining profile and center flatness values for the hot-rolled metal strip. The occurrence of fluctuations in the center flatness of the metal strip after the individual passes and the resulting disadvantages for the rolling stability and the product quality are prevented. The method provides that, also for the target center flatness of the metal strip after a predetermined pass k with i=1 . . . <k< . . . I and for the target center flatness after the subsequent passes, pass-specific interval ranges are also specified in each case, and in that the successive calculation of the control variables and profile values is then carried out taking into account such additional specifications as well.

18 Claims, 10 Drawing Sheets

(51) Int. Cl.
*B21B 13/14* (2006.01)
*G05B 13/04* (2006.01)

(52) U.S. Cl.
CPC ....... *B21B 2261/04* (2013.01); *B21B 2267/18* (2013.01); *B21B 2269/04* (2013.01)

(58) Field of Classification Search
CPC ..... B21B 2269/04; B21B 37/38; B21B 37/40; G05B 13/04
See application file for complete search history.

(56) References Cited

U.S. PATENT DOCUMENTS

| | | | |
|---|---|---|---|
| 6,164,103 | A | 12/2000 | Pichler et al. |
| 7,031,797 | B2* | 4/2006 | Reinschke .............. B21B 37/28 72/11.8 |
| 2004/0040358 | A1* | 3/2004 | Seidel ................... B21B 13/142 72/243.2 |
| 2007/0199363 | A1* | 8/2007 | Baumgartel ............ B21B 37/40 72/241.8 |
| 2011/0030432 | A1* | 2/2011 | Malik ..................... B21B 37/28 700/148 |
| 2017/0002440 | A1* | 1/2017 | Sprock ................... B21B 37/74 |
| 2018/0056349 | A1* | 3/2018 | Seidel .................... B21B 37/28 |

FOREIGN PATENT DOCUMENTS

| | | |
|---|---|---|
| CN | 101912886 A | 12/2010 |
| CN | 102029294 A | 4/2011 |
| CN | 102513372 A | 6/2012 |
| CN | 104741387 A | 7/2015 |
| CN | 107282648 A | 10/2017 |
| DE | 4040360 A1 | 6/1991 |
| DE | 19654068 A1 | 6/1998 |
| DE | 19851554 A1 | 5/2000 |
| DE | 10102821 A1 | 7/2002 |
| EP | 0121148 A1 | 10/1984 |
| EP | 0591291 A1 | 4/1994 |
| EP | 0618020 A1 | 10/1994 |
| EP | 1030747 A1 | 8/2000 |
| EP | 0850704 B1 | 2/2003 |
| EP | 1481742 B1 | 7/2007 |
| EP | 3009204 A1 | 4/2016 |
| JP | H01254305 A | 10/1989 |
| JP | H08300025 A | 11/1996 |
| JP | 2005313177 A | 11/2005 |
| JP | 2008279475 A | 11/2008 |
| JP | 2018511483 | 5/2019 |
| WO | 2006000290 A1 | 1/2006 |
| WO | 2016146621 A1 | 9/2016 |

* cited by examiner

METHOD FOR ASCERTAINING CONTROL VARIABLES FOR ACTIVE PROFILE AND FLATNESS CONTROL ELEMENTS FOR A ROLLING STAND AND PROFILE AND AVERAGE FLATNESS VALUES FOR HOT-ROLLED METAL STRIP

TECHNICAL FIELD

The disclosure relates to a method for ascertaining control variables for active profile and flatness control elements for at least one rolling stand for hot rolling metal strip with a plurality of i=1 . . . I successive passes and for ascertaining profile and center flatness values for the hot-rolled metal strip.

BACKGROUND

The invention is described below using numerous technical terms. For a better understanding of the invention, such technical terms, all of which are known in the prior art, will initially be explained with reference to FIGS. 3 to 10.

FIG. 3 shows a schematic diagram of a rolling mill finishing train for hot rolling metal strip with, as an example, seven finishing rolling stands F1-F7. The individual finishing rolling stands are each assigned mechanical control elements for influencing the center flatness and/or the profile of the metal strip. The profile and flatness control elements are, for example, devices for the axial displacement of work rolls if these have a so-called "continuously variable crown—CVC grind" or a so-called "smart crown grind." FIGS. 3 and 4 illustrate the CVC or smart crown grind of the work rolls; FIG. 4 additionally illustrates the CVC principle, with which the S-shaped ground work rolls are axially displaced. Furthermore, it is indicated in FIG. 3 that the profile of the metal strip is increasingly less affected as the number of finishing rolling stands passed through increases. In contrast, the permitted center flatness is particularly high in the first stands of the rolling mill finishing train, while it is increasingly narrow in the rear stands of the rolling mill finishing train.

The concept of a profile for a metal strip to be rolled is explained in FIG. 5. A distinction is made between the term "absolute profile" and the term "relative profile." It is important to understand that the term "profile" C here—in contrast to the colloquial meaning of this term—does not mean the shape of the cross-section of the metal strip (strip contour), but actually the vertical distance of the surface of the metal strip from a notional ideal horizontal line P through the highest point of the profile in the middle of the strip as seen in the width direction. The profile defined in this manner or the vertical distance defined in this manner is always determined or defined only at a specific width position X at a predetermined distance from the edge of the metal strip, for example X=25 mm. The absolute profile values are calculated as the difference between the strip thickness $H_M$ at the center of the width of the metal strip minus the thickness $H_X$ of the metal strip at the distance X from the strip edge offset inwards.

The terms "body area," that is, "center area," "strip edge," "strip edge areas" and "strip contour area" are further illustrated in FIG. 5.

FIG. 6 illustrates the concept of "waviness" or equivalently "flatness," of the metal strip. When passing through a rolling stand, the metal strip undergoes a forming process, which can result in particular in a change of its strip shape (contour). Two examples of this are shown in FIG. 6. Depending on the shape (contour) of the metal strip before entering the rolling mill finishing train and depending on the forming experienced there, the strip shape (contour) of the metal strip leaving the mill can be different. In particular, the outgoing metal strip may have undesirable edge waves or center waves. The formation of wave crests or wave troughs means an additional lengthening of the strip compared to the uniform lengthening L with a flat strip (without waves). Such change in strip length over the width of the strip is shown in FIG. 6 as an example for a strip with edge waves. In particular, it can be seen that the longitudinal bands of the metal strip are elongated at the edge relative to an original initial length L. The greater the amplitude of the waves, the greater the elongation. Distributed over the width B of the metal strip, for example, a parabolic distribution results. The magnitude of the respective strip elongation Δ L in relation to the original strip length L serves as a measure for the center flatness or waviness, as the case may be, of the metal strip. A positive ratio Δ L to L represents edge waves, while a negative ratio Δ L to L represents center waves.

The topic of strip profile and center flatness adjustment for (finishing) rolling stands is dealt with in the following publications from the patent literature, among others:

In European patent EP 0591291 B1, a shape control straight line is described. When controlling finishing rolling stands according to such straight lines, the relative strip profile (profile divided by thickness in percent) is kept constant within a rolling train and when following these straight lines, good flatness should be achieved in particular with thin metal strip at the end of the finishing train. The tolerance window around such shape control straight line is defined by limit curves and can be exploited in the determination of the profile. For small end thicknesses, the tolerance range is small in order not to negatively influence the strip flatness. The definition of the strip profile value is given here according to DIN EN 10051 in relation to a reference point from the edge. Flatness in a defined central area of the strip is not considered here.

The patent application DE 4040360 A1 discloses a similar arrangement. Here as well, it is described that, in particular for thin strips, there is a relative profile constancy from stand to stand, and that under acceptable boundary conditions the profile decreases linearly with strip thickness.

European patent EP 0850704 B1 deals with the improvement of flatness within the rolling mill finishing train. Here, a target and flatness shape is specified over the width of the strip. The unflatness should also be kept within limits in the area of the strip edge. The flatness is described separately for the body area, that is, the center area of the metal strip, and the area of the strip edges. Here as well, the unflatness is to be kept within defined limits.

When adjusting the rolling parameters in a rolling mill finishing train with the aim of rolling increasingly thinner and/or higher-strength metal strips with good center flatness, the following problems can arise:

a) In the case of thin and/or high-strength metal strips, the rolling force level is high if such metal strips are rolled in a hot strip rolling mill finishing train. As a rule, the rolling force decreases within the rolling train from the front to the rear finishing rolling stands; see FIG. 8a). The pressed length, that is, the contact area between the work roll and the rolled material, also decreases accordingly from the front to the rear finishing rolling stands, even disproportionately; see FIG. 8b). This increases the rolling pressure, that is, the rolling force divided by the contact area (pressed length times strip width) from the first to the last stand; see FIG. 8c). Such effect leads to an increased flattening of the work roll, which has a profile effect in the strip edge area in the form of a steeper strip edge drop, that is, in the form of a so-called "edge sharpening."

b) In addition, the rolling schedules in modern rolling mill finishing trains are extended, that is, the operating times of the work rolls are also extended as a result. Given that, thereby, more metal strip of the same width has to be finish-rolled, wear on the surface of the work rolls also increases, resulting in deeper recesses on the roll surface. As a result, the edge sharpening is further increased, that is, the strip edge drop becomes steeper; compare FIG. 9a) with FIG. 9b).

c) Finally, cyclic displacement of the work rolls from metal strip to metal strip, in particular during passages within a rolling schedule with almost constant strip width, also equalizes work roll wear. The wear of the work rolls is relatively high, in particular in the last stands of the rolling mill finishing train; see FIG. 8d). Such wear of the work rolls, as shown in FIG. 8d) and FIG. 9, therefore has a particularly negative influence on the edge area of the metal strip to be rolled, in particular in the last stands of the rolling mill finishing train.

Both effects described, that is, both the increase in rolling pressure, see FIG. 8c), and the increasing wear with increasing rolling schedule length, see FIG. 8d), lead to the undesirable effect of a steeper strip edge drop, that is, "strip edge sharpening."

d) In many cases, and in particular with the above boundary conditions, the strip edge drop or the increasing strip edge drop from pass to pass or from stand to stand can therefore take place at distances X with, for example, X=40 or X=25, that is, 40 or 25 mm from the strip edge, as illustrated in FIG. 10. At that point, both the strip contour between the strip center and the respective associated profile reference value Cx and the strip edge migration from pass to pass, along with the center flatness form, no longer have a purely parabolic shape.

Under such conditions, the strategy under the prior art according to European patent EP 0591291 B1 or German patent application DE 4040360 A1 and the shape control straight lines, with which the relative strip profile is kept almost constant, for example within a finishing rolling mill and in particular at the profile reference value C40, see FIG. 7a), usually leads to body unflatness, that is, in the central area—viewed over the width of the metal strip—to central unflatness. Such unflatness, not to be confused with center waves according to FIG. 6) of the metal strip, are illustrated in FIG. 7b). It can be seen that the center flatness of the metal strip to be rolled varies considerably with this strategy, in particular at the exits of the first stands of the rolling mill finishing train. Only when passing through the rolling mill finishing train do the fluctuations of the center flatness decrease further with increasing number of stands, with the center flatness approaching the target flatness of 0 at the last rolling stand in the form of a transient process. Such level and such change of flatness in the middle area of the metal strip within the rolling mill affect rolling stability and product quality.

FIGS. 7a) and 7b) illustrate the principle of straight line shape control described in the prior art, for example in EP 0591291 B1. Specifically, FIG. 7a shows how, starting from a relative blank strip profile or slab profile of 0.5%, the target strip profile of Cx=1.9% is adjusted within the rolling mill finishing train. With the conventional setting strategy under the prior art, the profile and flatness control elements associated with each of the finishing rolling stands I=1 ... 7 are each adjusted to realize the relative target strip profile Cx at a predetermined profile reference point for the metal strip profile, x mm inwardly offset from the strip edge (x=40 mm or x=25 mm). As shown in FIG. 7a), this is almost already achieved with the first finishing rolling stand i=1 and the value of 1.9% for the relative strip profile, which is already almost achieved there, is maintained almost constantly with all subsequent stands i=2-7.

However, such quasi-ideal realization of the criterion of "keeping the relative strip profile constant" has its price. Such price or the disadvantage associated with it is shown in FIG. 7b) in the manner that the flatness of the metal strip in the center area of the metal strip, that is, the center flatness, is not optimal, in particular in the middle stands of the rolling mill finishing train, as described above. Such center unflatness can have a negative influence on the strip run. Even if the calculated center unflatness is within or at the allowable center flatness tolerance windows, the setting is not optimal and can interfere with sensitive strips.

SUMMARY

The disclosure is based on the task of improving a known method for ascertaining control variables for active profile and flatness control elements for at least one rolling stand for hot rolling metal strip in such a manner that the occurrence of fluctuations in the center flatness of the metal strip from pass k (for example, k=2) and the resulting disadvantages for rolling stability and product quality are prevented.

This task is achieved by the method as claimed. It is characterized in that, in addition, pass-specific interval ranges are also specified in each case for the target center flatness of the metal strip after a predetermined pass k with $i=1<k<I$ and for the target center flatness values after the subsequent passes i with $k<i\leq I-1$, wherein the interval ranges are in each case within the center flatness thresholds; and in that the successive calculation of the control variables for the profile and flatness control elements and of the profile and center flatness values for the metal strip for the individual passes is carried out with the assistance of the technological model, with additional consideration of the respective, preferably narrowed, predetermined interval ranges for the target center flatness of the metal strip for the passes $k\leq i\leq I$.

The terms "body flatness," "flatness" and "center flatness" are used synonymously within the framework of the present description. Flatness in the immediate edge area of a metal strip are not of concern in the present disclosure.

In the present description, the term "pass" always means a pass executed by a rolling stand with active profile and flatness control elements. This does not rule out the possibility that the metal strip has already been subjected to passes without being influenced by active profile and flatness control elements, for example in upstream roughing stands and/or in early stands of a rolling mill finishing train.

The term "process-related center flatness thresholds" means edge-wave thresholds in the upper range and center wave thresholds in the lower range. The term "center flatness" used should not be confused with the term "center waves." By definition, center flatness is flatness (or unflatness) that is formed as or acts as an edge or center wave. The center flatness is calculated or arises from a strip contour change during a pass in the primarily middle strip area in a positive or negative direction. Process-dependent center flatness thresholds mean non-optimal flatness from a technical process point of view, which, however, can still be tolerated in connection with a contour or profile change depending on thickness, width, material and/or pass number, etc.

The term strip means metal strip, in particular steel strip.

The specified interval ranges for the target center flatness can also be specified infinitesimally small or narrow, which then corresponds to the specification of singular target center flatness values for individual passes.

Due to the further specifications, specifically that the target center flatness for individual passes should preferably be zero or/and within a predetermined interval range, the technological model can calculate the desired control variables, profile values and center flatness values more precisely, by which the fluctuations in the center flatness of the metal strip from pass k and the resulting disadvantages for rolling stability and product quality can be prevented.

Further advantageous embodiments of the method are the subject of the dependent claims. The terms described in the introduction from the prior art in accordance with FIGS. 3 to 10 apply equally to the following description of the invention.

BRIEF DESCRIPTION OF THE DRAWINGS

The description is accompanied by 10 figures.

DETAILED DESCRIPTION

The invention is described in detail below with reference to the aforementioned FIGS. 1 and 2 in the form of exemplary embodiments.

The invention relates to a method for ascertaining profile and center flatness values along with control variables for active profile and flatness control elements for at least one rolling stand for hot rolling metal strip. Hot rolling is performed with a plurality of i=1 . . . I successive passes. The method comprises the following steps, see also FIG. 1:

In accordance with step a1), initially the target profile value and the target center flatness value for the metal strip after the last pass and process-related center flatness thresholds for the metal strip after the individual passes i are specified, wherein an interval range is specified for the target center flatness after the last pass, which lies within the process-related center flatness thresholds or is limited by them.

In accordance with step b), such specifications are entered into a technological model for simulating the hot rolling process. In addition, pass-specific interval ranges are also specified for the target center flatness of the metal strip after a predetermined pass k with i=1 . . . <k< . . . I as well as for the target center flatness for the subsequent passes with k<i≤I−1 (method step a2). The calculation of the control variables for the profile and flatness control elements along with the calculation of the at least one profile and center flatness value for the metal strip for the individual passes is then carried out with the assistance of the technological model, taking into account all respectively predetermined interval ranges for the target center flatness of the metal strip for the passes k≤i≤I. The calculation must also be explicitly carried out again for pass I, because its values may have changed on the basis of the calculations for the preceding passes.

Figure 1:
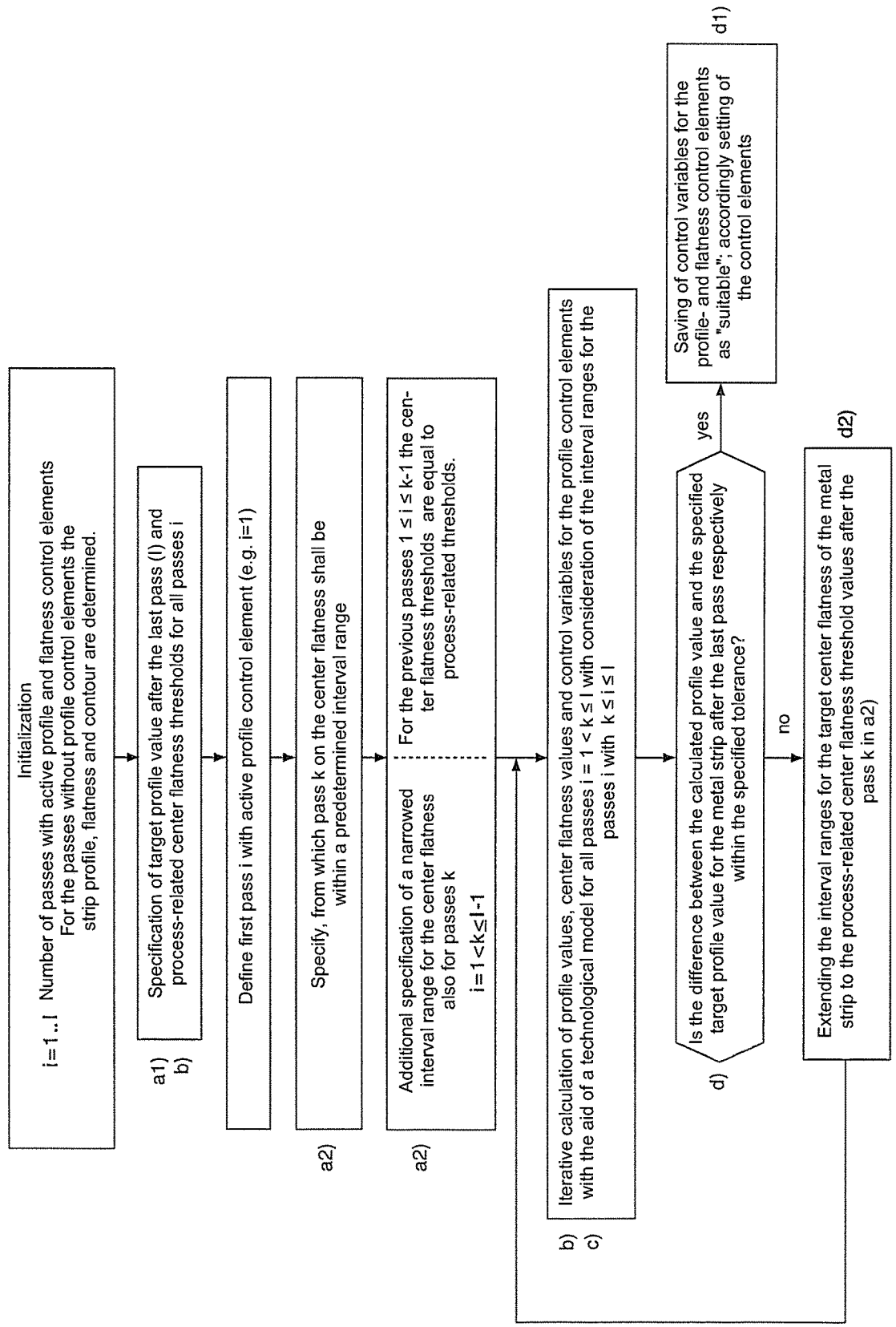
FIG. 1 is a flowchart for illustrating the method.
Figure 2:
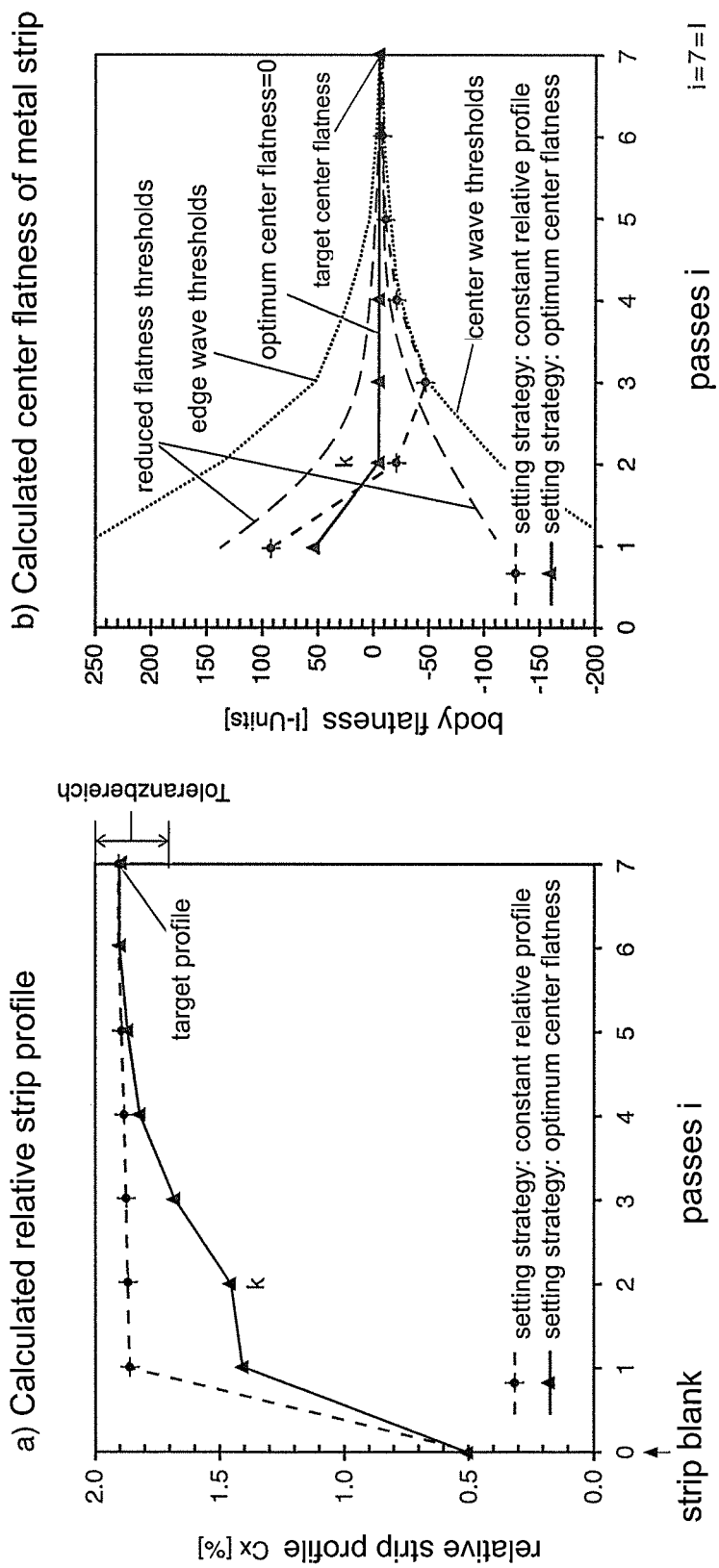
FIG. 2 illustrates a comparison of the method and a procedure known from the prior art, in each case for a) adjusting of profile and b) center flatness values along with control variables for active profile and flatness control elements for a rolling stand.

Before the successive calculation of the control variables for the profile and flatness control elements, it makes sense to initially determine the first pass (i=1)—or in a rolling mill finishing train the first rolling stand—with which profile and flatness control elements that can be activated at all are available; see the initialization step above in FIG. 1. Typically, this first stand is structurally and functionally fixed and typically it is actually the first rolling stand in a rolling mill finishing train. However, this does not necessarily have to be the case, because the first rolling stand with activatable profile and flatness control elements can also be preceded by other types of rolling stands without activatable profile and flatness control elements.

Furthermore, before the successive calculation of the control variables, the pass k from the set i=1 . . . <k< . . . I must also be determined, from which the target center flatness of the metal strip is to be specified as lying in the predetermined interval range; see the second method step after initialization in FIG. 1. Preferably, this is already done from the second and with the subsequent passes or rolling stands.

With such specifications, as already mentioned, the calculation of the control variables for the profile and flatness control elements along with the calculation of the at least one profile and center flatness value for the metal strip after the individual passes is then carried out with the assistance of the technological model. Particularly preferably, on the first run of the simulation, the interval range for the target center flatness from the second pass is set to zero or close to zero or less than half the values of the technological center flatness limits.

This procedure offers the advantage that the center flatness of the strip to be rolled is already very early, ideally already after the second rolling mill finishing train stand with active profile and flatness control elements within the finishing train—or ideally after the third method step which was carried out with active profile and flatness control elements—within the predetermined interval range, preferably at zero; see the solid line entitled "setting strategy optimum center flatness" marked with black triangles in FIG. 2b).

This presupposes that a large adjustment range for the profile control elements must be provided at the upstream rolling mill stand, typically the first rolling stand, in the rolling mill finishing train or in the first pass, which, if it were to be exhausted, would also result in larger center flatness values, in particular larger edge and center waviness with the metal strip to be rolled at the exit of the first finishing rolling stand. However, this is not critical because, for the first finishing rolling stands, in particular for the first finishing rolling stand or for the first pass, the process-related specified center flatness thresholds, in particular for the edge and center waviness of the metal strip, are still wide open. Typically, the limits for the first rolling stand are so wide that, even with full use of the adjustment range of the profile control elements, the wide limits of center flatness are not reached for the metal strip; see FIG. 2b). This in turn has the advantage that, with regard to the specified center flatness thresholds for the subsequent passes, there is still sufficient reserve to be able to react to any disrupting influences without having to thereby exceed the center flatness thresholds for the edge and center waviness.

FIG. 2a) shows with the line entitled "setting strategy=optimum center flatness" the effect that must be accepted for the desired rapid achievement of the target center flatness within the rolling mill finishing train or in the case of early passes. Specifically, the rapid achievement of the target center flatness is achieved with a comparatively slower approach of the simulated or calculated relative profile values to the specified target profile values, in particular at the exit of the last finishing rolling stand in the rolling mill finishing train or at the last pass, as the case may be. However, this is accepted as it is practically irrelevant.

The dashed lines entitled "setting strategy=constant relative profile," on the other hand, show in FIG. 2a) the course of the relative strip profile or profile values and in FIG. 2b) the course of the body flatness or center flatness for the metal strip to be rolled within the rolling mill finishing train with the rolling stands 1-7 or for the passes i=1-7 in accordance with the prior art, as described above.

In accordance with a first exemplary embodiment, the specified successive calculation of the control variables for the profile and flatness control elements along with the calculation of the at least one profile value and the center flatness value for the metal strip is also carried out under the additional condition that the difference between the calculated profile value and the predetermined target profile value for the metal strip after a pass, in particular after the last pass, lies within a predetermined tolerance range, which is preferably also predetermined to be zero (method step d); see FIG. 1.

The hot rolling of the metal strip can be carried out either in a rolling mill finishing train with a plurality of finishing rolling stands with active profile and flatness control elements or with a reversing rolling stand. In the rolling mill finishing train, each finishing rolling stand executes its own pass. With the reversing rolling stand, the same work rolls apply the successive passes to the metal strip.

The presence of powerful profile and flatness control elements, in particular on the stand for the first pass, whether in a rolling mill finishing train or in a reversing stand advantageously enables the following two (boundary) conditions or specifications to be met:

1. It can be achieved that the calculated or simulated center flatness already lies from the $k^{th}$ pass, preferably from the $k=2^{nd}$ pass, within an interval range for the target center flatness predetermined in accordance with the method. Particularly preferably, the center flatness is already at or near zero or within the technological center flatness limits from the $k=2^{nd}$ pass.

2. It can further be achieved that the calculated or simulated profile value for the metal strip after the last pass is within a predetermined tolerance range for the target profile value after the last pass. The tolerance range, that is, also the tolerance range for the difference between the target profile value and the calculated or simulated profile value, is for example 0 μm to +/−10 μm, preferably 0 μm to +/−3 μm or ideally 0 μm.

Only in rare cases does the second pass require a correction of the strip profile and thus, above all, a center unflatness, that is, a center flatness outside the predetermined interval range.

The control variables for the profile and flatness control elements determined in this manner with the assistance of the technological model, which enable or ensure compliance with the two conditions, are stored as "suitable" or used to set the rolling train.

If, on the other hand, it turns out, during a first run of the simulation, that the control variables required to comply with the two conditions mentioned lie outside their limits or, if certain control variables are used, the difference between the calculated profile after the last pass and the specified target profile value of the metal strip lies outside the tolerance or tolerance range, as the case may be, then the interval ranges specified so far for the target center flatness of the metal strip for immediately after the pass k are preferably extended in step a2) to the process-related center flatness thresholds. The iterative or successive calculation of the profile and flatness control variables is then iteratively repeated with the changed boundary conditions. This takes place until the target profile value for the metal strip is reached after the last pass or until the target center flatness of the metal strip has been extended for all subsequent passes. In other words: The iterative or successive calculation of the control variables for the active profile and flatness control elements for optimizing their setting is carried out until the difference between the calculated profile value and the specified target profile value lies within the tolerance range, in particular for the last pass, or until the target profile values for all passes have been extended to the center flatness thresholds.

The interval range for the target center flatness after an individual pass is specified, for example, as 0% to +/−50%, preferably 0% to +/−25% and particularly preferably 0% of the respective process-dependent specified center flatness threshold after the respective pass.

Figure 5:
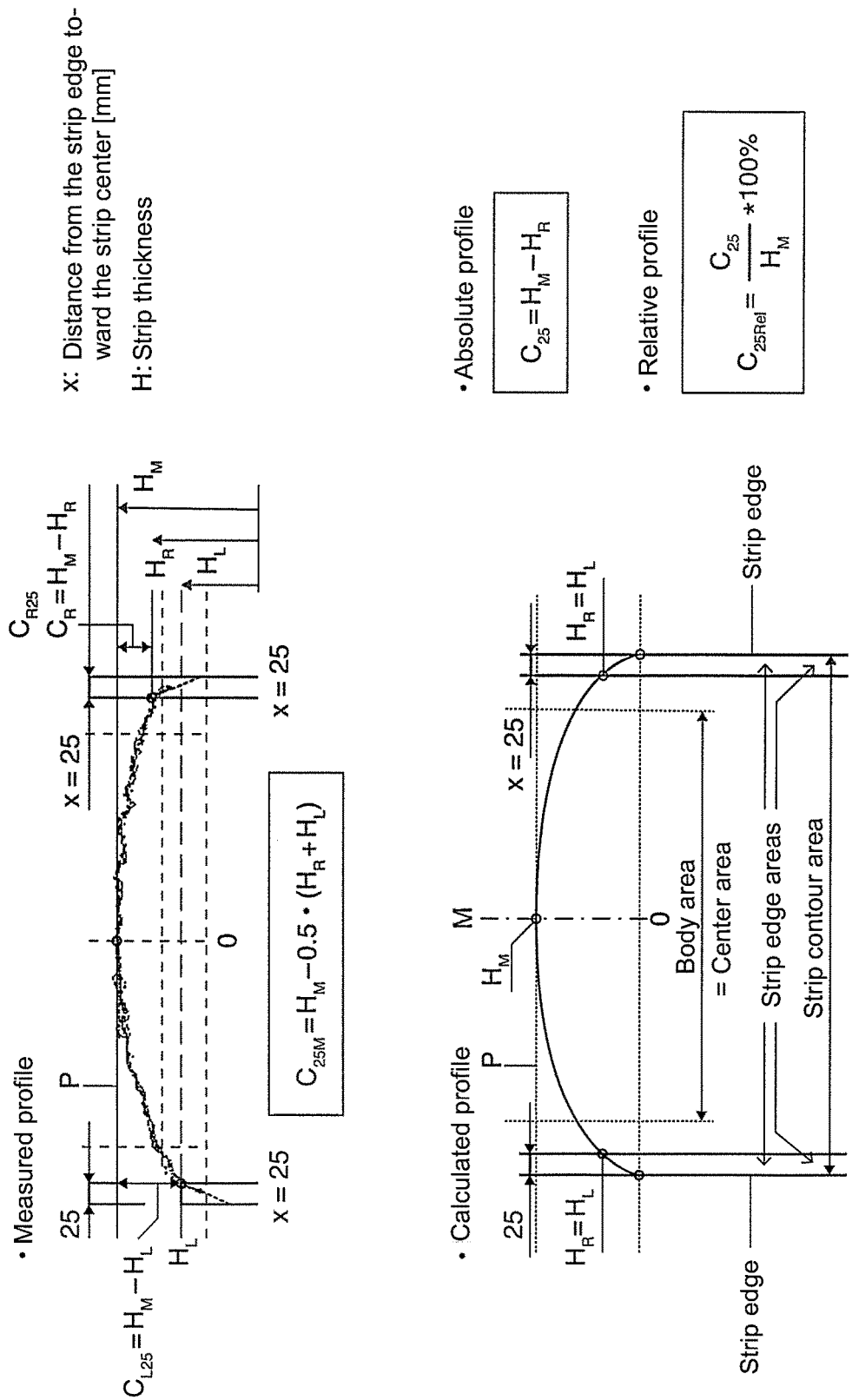
FIG. 5 illustrates the concept of the profile for a metal strip to be rolled (prior art).
Figure 6:
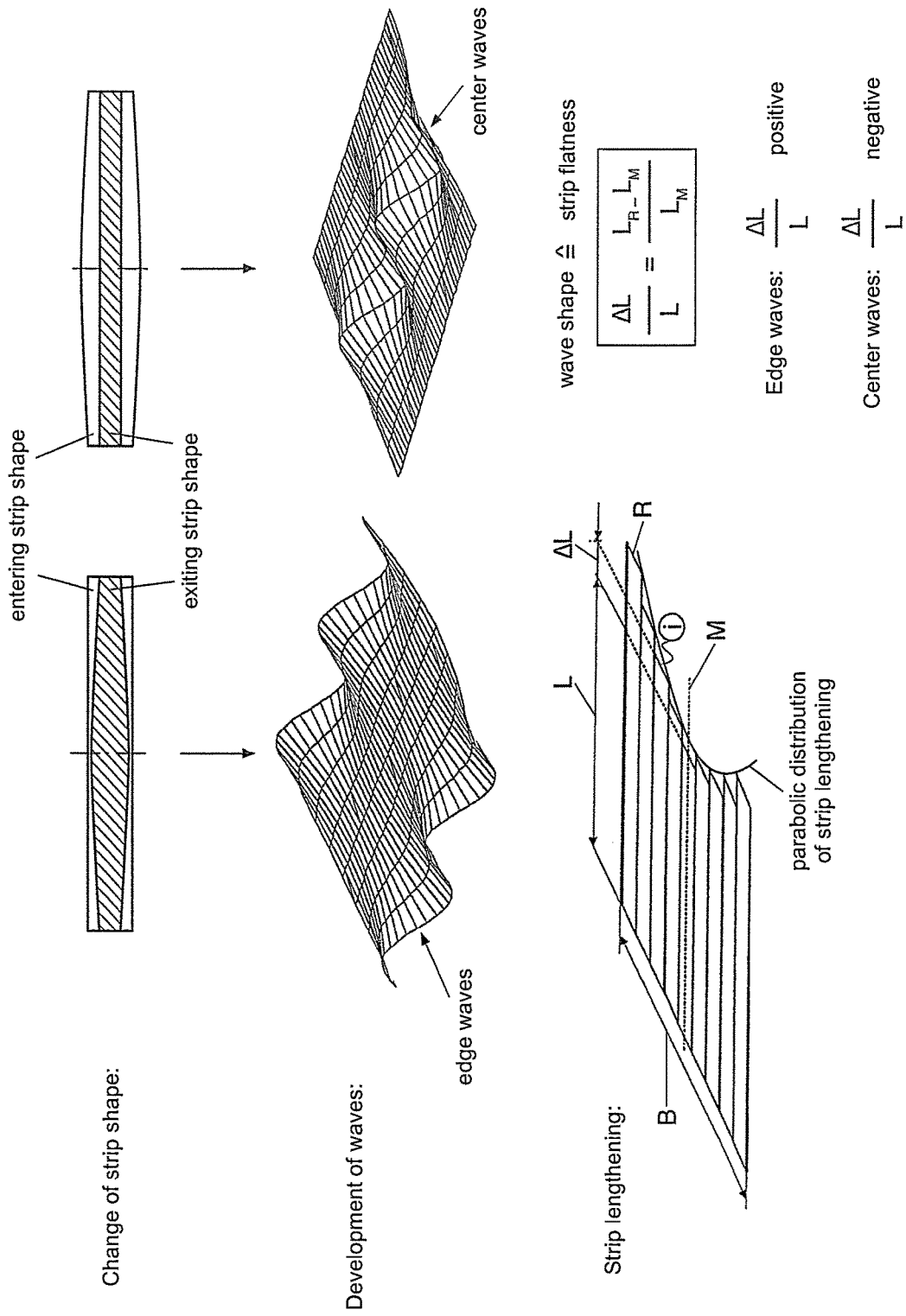
FIG. 6 illustrates the concept of waviness, or equivalently, the center flatness of the metal strip (prior art).
Figure 7:
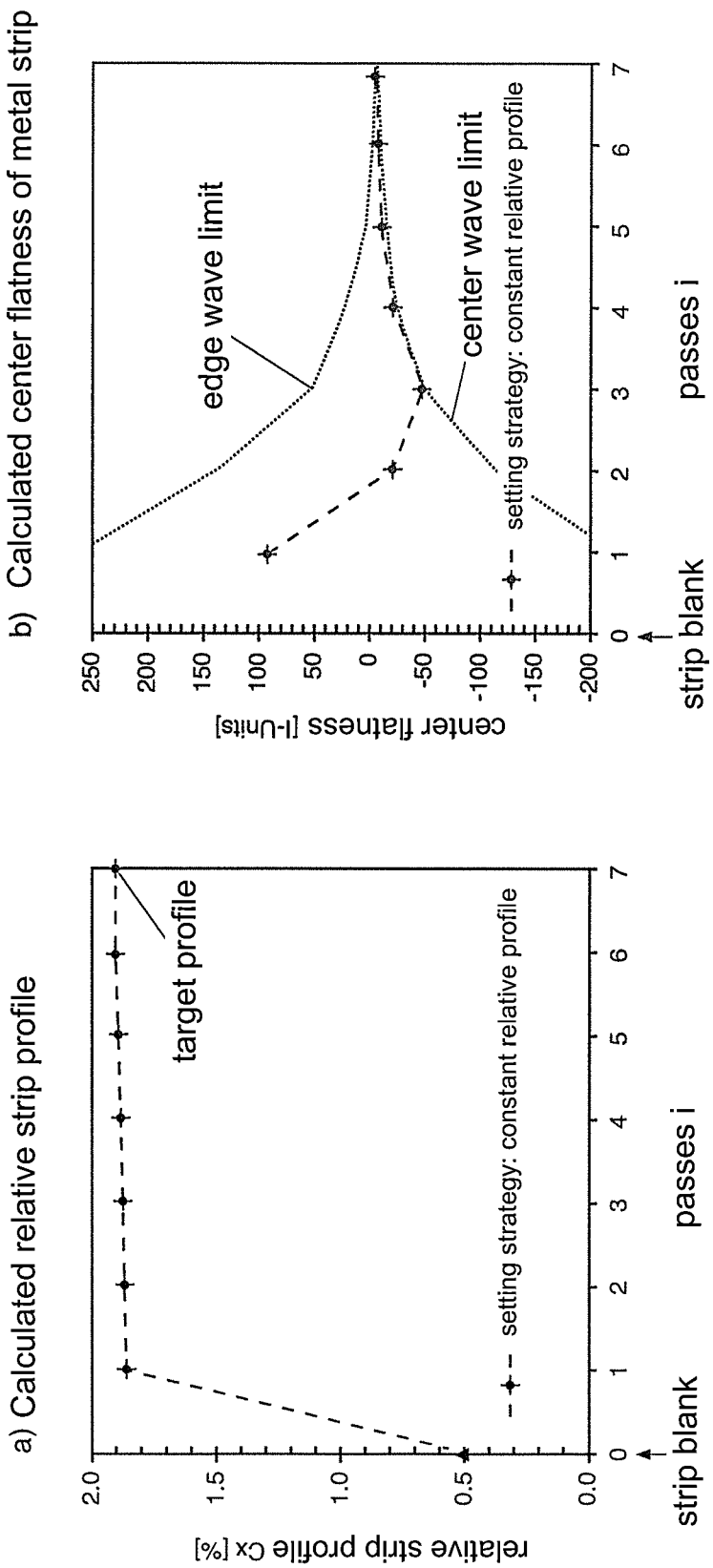
FIG. 7 illustrates the conventional method for ascertaining profile and center flatness values along with control variables for active profile and flatness control elements for rolling stands, for example in a rolling mill finishing train, wherein such conventional method aims at keeping a relative strip profile for the metal strip as constant as possible (prior art).
Figure 8:
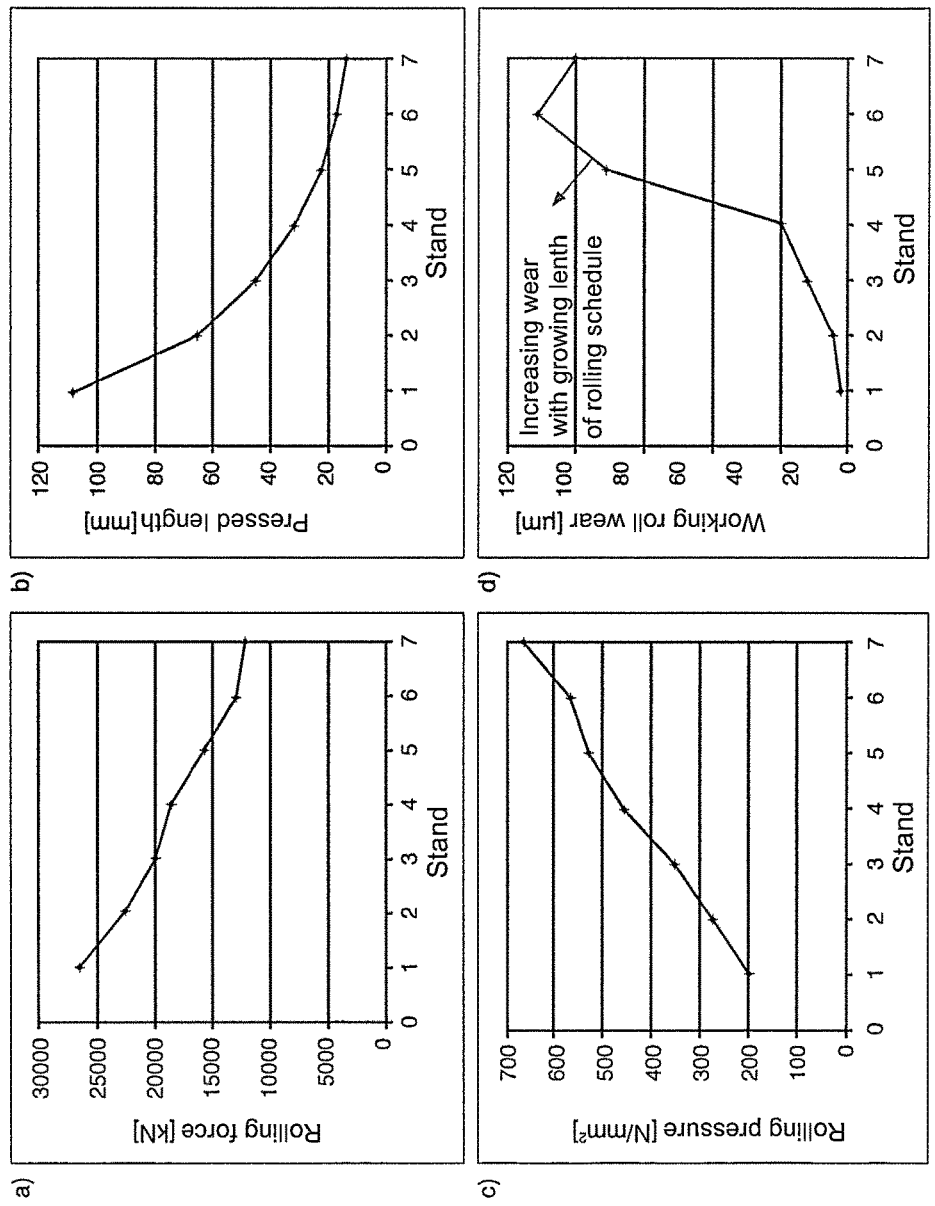
FIG. 8 illustrates rolling parameters for higher-strength strip (prior art).
Figure 9:
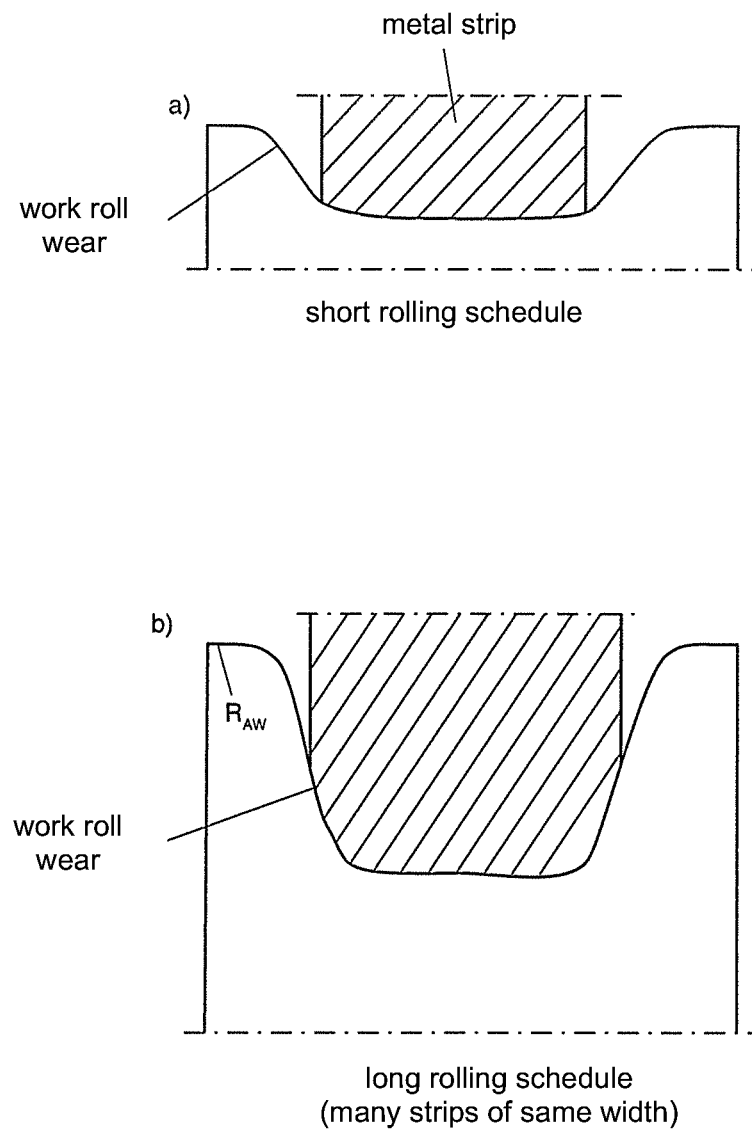
FIG. 9 illustrates the effects of worn-out or heavily worn work rolls on the edge area of a metal strip to be rolled in accordance with the prior art.
Figure 10:
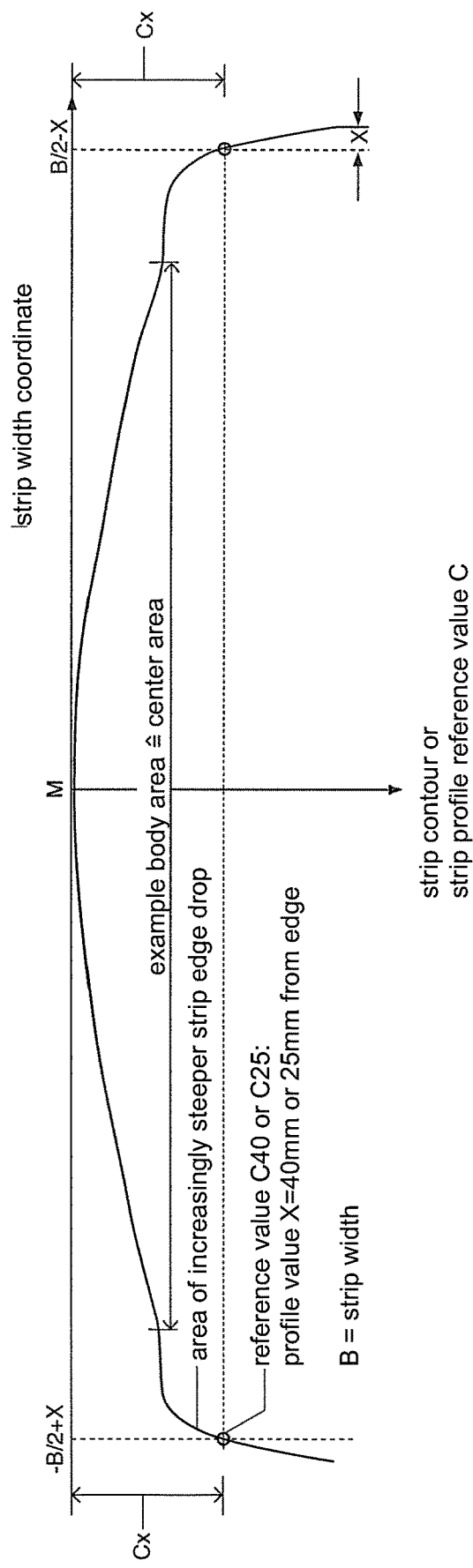
FIG. 10 illustrates the contour of a finished rolled metal strip with undesired strip edge sharpening (prior art).

The calculated profile value and the specified target profile value each refer to the same predetermined distance X, with for example X=25 mm or X=40 mm, offset inwards in the width direction from the edge of the metal strip. The calculated profile value and the specified target profile value can be either absolute or relative profile values; see FIG. 5.

In step c), the control variables for the profile and flatness control elements can further be iteratively calculated for each pass, such that, after each pass, the calculated center flatness matches the predetermined target center flatness as closely as possible.

In addition to the parameters of center flatness and profile value, the parameter contour of the metal strip can also be taken into account in the determination of control variables. For this purpose, a target contour for the metal strip after the individual passes is also specified in step a1), and the strip contour of the metal strip after each pass is also calculated in step c). Finally, in step c), the technological model is used to iteratively calculate the control variables for the profile and flatness control elements for each pass in such a manner that, after each pass, the calculated strip contour matches a predetermined target contour as closely as possible.

The following options are available for ascertaining the center flatness of the metal strip after a pass:

a) Evaluation of the parabolic component of the calculated strip elongation ΔL/L over the width of the metal strip;
b) as with a), but with a stronger weighting of the strip elongations in the middle area of the metal strip than in the area of the edge of the metal strip;
c) evaluation of the difference between the relative profile values at the passes i and i−1, each at a fixed/same reference point a>X further inwards from the edge of the metal strip in the width direction;
d) arithmetic averaging of the calculated strip elongation ΔL/L from different calculation points over a defined width range, preferably over the middle width range; and/or
e) evaluation of the difference between the calculated relative profiles at or after the passes i and i−1, in each case at a variable reference point with a>X further inwards from the edge of the metal strip in the width direction, wherein a is selected as a function of the strip width, the thickness of the metal strip and the material quality.

Figure 3:
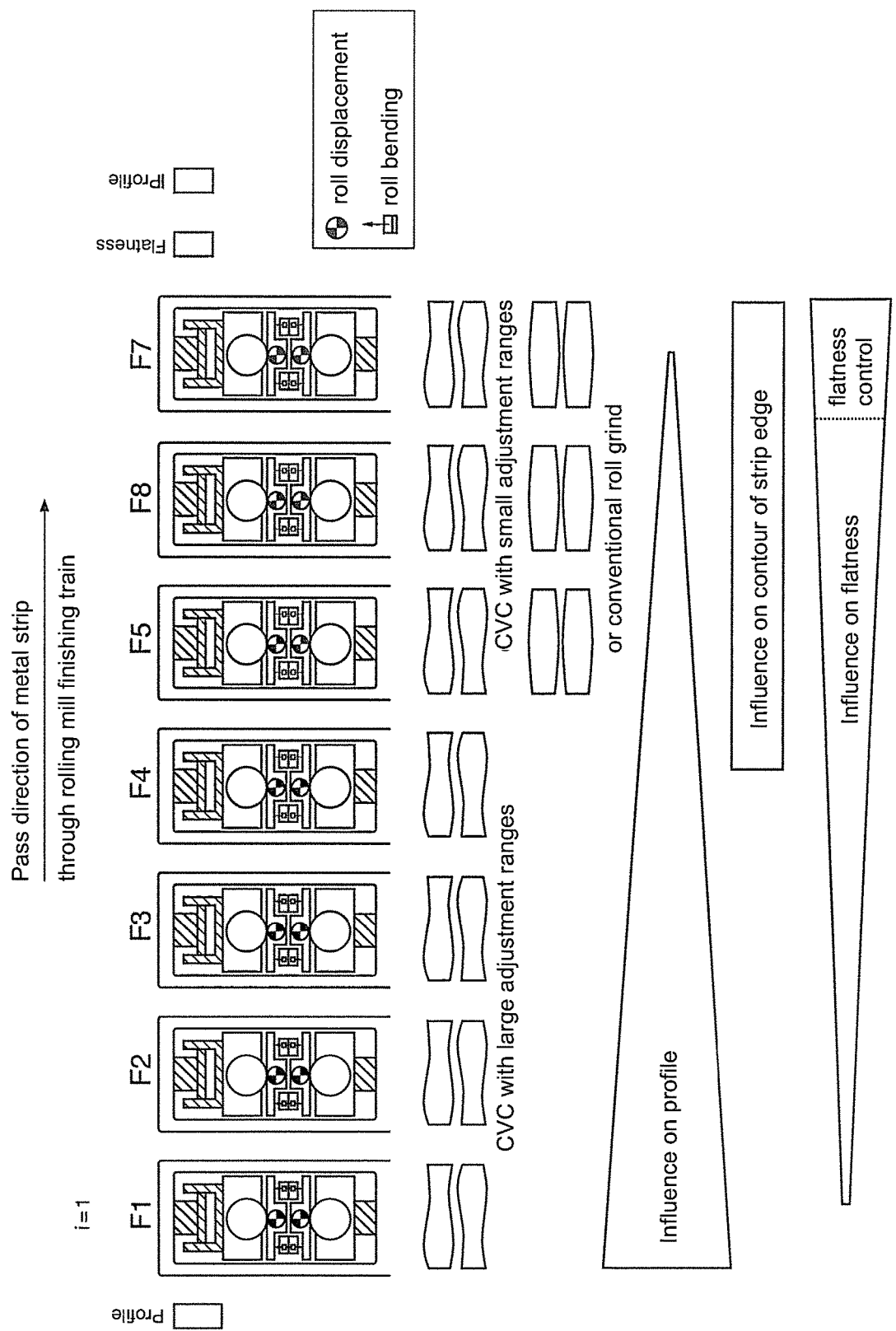
FIG. 3 illustrates a schematic representation of a rolling mill finishing train and its profile control elements for hot rolling metal strip in accordance with the prior art.
Figure 4:
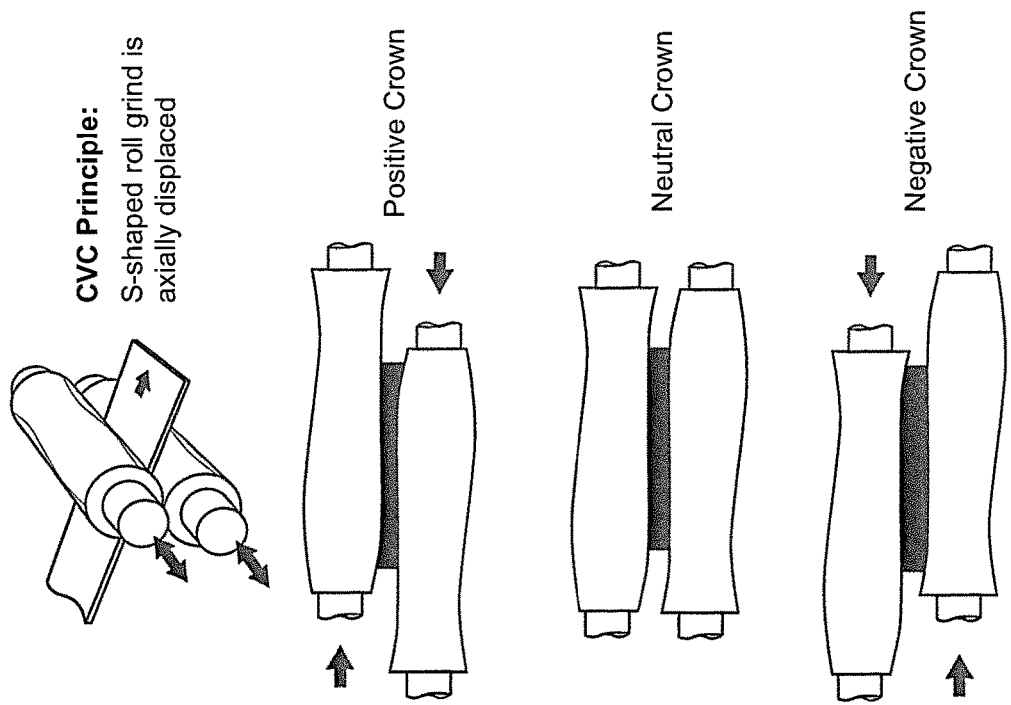
FIG. 4 illustrates the continuous variable crown CVC principle (prior art).
Figure 4:
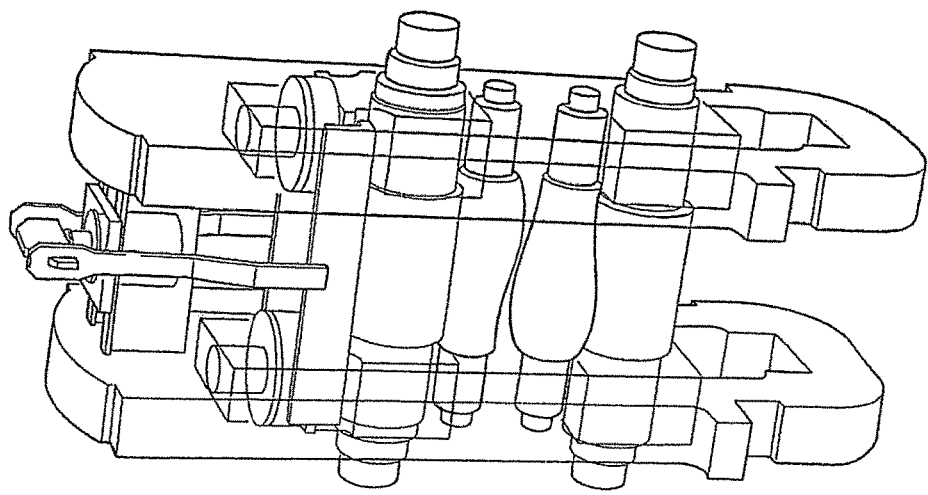

The profile and flatness control elements can be, for example, devices for the axial displacement of S-shaped profiled work rolls, which corresponds to a change in the work roll crown; see FIG. 4. Alternatively or additionally, there can be devices for crossing the work rolls and/or bending devices for bending the work rolls; see FIG. 3.

The effective efficiency of a profile or flatness control element can be quantified with an equivalent change in work roll crown $\Delta C_{AW}$. The adjustment range of a work roll crown $\Delta C_{AW}$, which can preferably be generated on at least the first rolling stand with profile control elements, should satisfy the following condition:

$$\Delta C_{AW} > K_{AW} \cdot BL^2$$

with $K_{AW}$=0.14 mm/m² or in particular preferably $K_{AW}$=0.18 mm/m² as factor $\Delta C_{AW}$ in mm: Work roll crown adjustment range=max. AW crown-min AW crown (parabolic proportion related to AW bale length as reference width)

BL in m: Work roll bale length

Alternatively or additionally, an equivalent roll gap profile adjustment range $\Delta C_{WS}$ for the effectiveness of the sum of control elements of a rolling stand of $$\Delta C_{WS} > K_B \cdot B_{max}^2$$

with $K_B$=0.16 mm/m² or in particular preferably $K_B$=0.2 mm/m² as factor $\Delta C_{WS}$ in mm: Change of the roll gap profile when changing the setting position of the profile control element or control elements of the stand between the min./max. adjustment range (calculated values without taking into account the interaction with the strip at the strip profile reference point, for example X=40 mm or X=25 mm offset inwards from the strip edge)

$B_{max}$ in m: Maximum target width of the strip is to generate preferably on at least the first rolling stand with profile control elements.

Of course, the control variables for the profile and flatness control elements simulated theoretically in accordance with the method, that is, with the assistance of the technological model, can also be used in practice. For this purpose, such simulated control variables, which are evaluated to be optimal or suitable, are adjusted on the real rolling stands and subsequently the metal strip is hot-rolled with the correspondingly adjusted rolling stands in a rolling mill finishing train or in a reversing rolling stand. The permissible absolute value ranges specified for the individual passes for the control variables of the profile and flatness control elements typically become smaller from the first to the last pass—viewed in the rolling direction.

The invention claimed is:

1. A method for hot rolling a metal strip and ascertaining control variables for active profile and flatness control elements for at least one rolling stand, comprising:
    hot rolling the metal strip in a plurality of i=1 . . . I successive passes through the at least one rolling stand;
    individually adjusting active profile and flatness control elements of the at least one rolling stand for each pass; and
    ascertaining profile and center flatness values for the metal strip by the following steps:
    a1) specifying a target profile value and a target center flatness after a last pass and process-related center flatness thresholds for the metal strip after individual passes (i), wherein an interval range or a singular target center flatness value is specified for the target center flatness after the last pass;
    a2) specifying pass-specific interval ranges in each case for the target center flatness of the metal strip after a predetermined pass (k) with i=1<k<I and for the target center flatness values after the subsequent passes (i) with k<i≤I−1, wherein the interval ranges lie in each case within the center flatness thresholds;
    b) inputting specifications into a technological model for simulating the hot rolling; and
    c) successively calculating control variables for the active profile and flatness control elements and a calculated profile value (Cx) and a calculated center flatness value for the individual passes (i) with assistance of the technological model based on of the specifications,
        wherein the successively calculating of the control variables for the profile and flatness control elements and of the profile and center flatness values for the metal strip for the individual passes with the assistance of the technological model is carried out, with additional consideration of the respective specified pass-specific interval ranges for the target center flatness of the metal strip for the passes k≤i≤I.

2. The method according to claim 1, further comprising:
    d) checking whether a difference between the calculated profile value and the specified target profile value for the metal strip lies within a specified tolerance range in each case after a pass; and
    d1) if the difference is within the tolerance range: storing the control variables for the profile and flatness control elements as "suitable"; or
    d2) if the difference is outside the tolerance range:
        extending the interval range for the target center flatness of the metal strip after the pass k in step a2); and
        iteratively repeating steps c) and d) with successive individual extension of the interval range for each subsequent pass k=k+1 until the difference lies within the tolerance range or the iteration ends at the last stand.

3. The method according to claim 2, further comprising:
f) adjusting the profile and flatness control elements with the control variables determined or stored as "suitable"; and
g) hot rolling the metal strip with the at least one rolling stand with the profile and flatness control elements adjusted in accordance with step f).

4. The method according to claim 1,
wherein the interval range for the target center flatness after a single pass is specified to be 0% to +/−50% of the respective process-related center flatness threshold after the respective pass.

5. The method according to claim 1,
wherein in step a2), an earliest/first predetermined pass (k), for which the interval range or the singular target center flatness value of the metal strip is specified, is the second pass with k=2.

6. The method according to claim 1,
wherein the calculated profile value and the specified target profile value for the metal strip each relate to a same predetermined distance (X) offset inwardly in a width direction from an edge of the metal strip.

7. The method according to claim 1,
wherein the calculated profile value and the specified target profile value are respectively either absolute or relative profile values.

8. The method according to claim 1,
wherein in step c), the control variables for the active profile and flatness control elements are further iteratively calculated for each pass, such that, after each pass, the calculated center flatness value is in the specified pass-specific interval range for the target center flatness.

9. The method according to claim 1, wherein
in step a1), a target contour for the metal strip is also specified after the individual passes;
in step c), the strip contour of the metal strip is also calculated after each pass; and
in step c), the control variables for the profile and flatness control elements are furthermore calculated iteratively for each pass in such a manner that, after each pass, the calculated strip contour corresponds as closely as possible to the predetermined target contour.

10. The method according to claim 1,
wherein the center flatness of the metal strip can be determined after a pass with one of the following options:
a) evaluation of the parabolic component of the calculated strip elongation $\Delta L/L$ over a width of the metal strip;
b) as with a), but with a stronger weighting of the strip elongations in the middle area of the metal strip than in the area of the edge of the metal strip;
c) evaluation of the difference between relative profile values of the metal strip after passes i and i−1, in each case at a fixed/same reference point a>X further inwards from the edge of the metal strip in a width direction;
d) arithmetic averaging of the calculated strip elongation $\Delta L/L$ from different calculation points over a defined width range, preferably over the middle width range;
e) evaluation of the difference between the calculated relative profile values of the metal strip after passes i and i−1, in each case at a variable reference point with a>X further inwards from the edge of the metal strip in the width direction, wherein a is selected as a function of a strip width, a thickness of the metal strip and a material quality.

11. The method according to claim 1,
wherein the active profile and flatness control elements are
devices for the axial displacement of S-shaped profiled work rolls, corresponding to a change in work roll crown $\Delta CAW$, and/or
devices for crossing the work rolls; and/or
bending devices for bending the work rolls.

12. The method according to claim 11,
wherein when using the device for the axial displacement of the S-shaped profiled work roll, the following applies at least to the first rolling stand with active profile and flatness control elements:

$$\Delta C_{AW} > K_{AW} \cdot BL^2$$

with
$KAW=0.14$ mm/m² or $KAW=0.18$ mm/m² as factor,
$\Delta C_{AW}$ in mm referring to a work roll crown adjustment range=max. AW crown−min AW crown (parabolic proportion related to AW bale length as reference width), and
BL in m referring to a work roll bale length.

13. The method according to claim 11,
wherein when using the device for the axial displacement of the S-shaped profiled work roll, an equivalent roll gap profile adjustment range $\Delta C_{WS}$ for the sum of the profile and flatness control elements of the rolling stand is generated at least at the first rolling stand with active profile and flatness control elements to:

$$\Delta C_{WS} > K_B \cdot B_{max}^2$$

with
$K_B=0.16$ mm/m² or $KB=0.20$ mm/m² as factor,
$\Delta CWS$ in mm referring to a change of the roll gap profile when changing the setting position of the profile control element or control elements of the stand between the min./max. adjustment range (calculated values without taking into account the interaction with the strip at the strip profile reference point, for example X=40 mm or X=25 mm offset inwards from the strip edge), and
$B_{max}$ in m referring to a maximum target width of the strip.

14. The method according to claim 1,
wherein the at least one rolling stand is one of a plurality of finishing rolling stands with active profile and flatness control elements in a rolling mill finishing train, and
wherein each of the plurality of finishing rolling stands executes a respective pass i=1 . . . I during the hot rolling of the metal strip.

15. The method according to claim 14,
wherein a first of the plurality of finishing rolling stands with active profile and flatness control elements is preceded in the rolling mill finishing train by one or more upstream rolling stands without active profile and flatness control elements.

16. The method according to claim 14,
wherein the first finishing rolling stand with active profile and flatness control elements is determined at the beginning of the method.

17. The method according to claim 1,
wherein the rolling stand is a reversing rolling stand,
wherein work rolls of the reversing rolling stand apply the successive passes i with i=1 . . . I to the metal strip.

18. The method according to claim 1,
wherein the permissible absolute value ranges specified for the individual passes for the control variables of the profile and flatness control elements become smaller from the first to the last pass.

\* \* \* \* \*